(12) United States Patent
Lang et al.

(10) Patent No.: US 8,666,311 B2
(45) Date of Patent: Mar. 4, 2014

(54) SATELLITE ON-BOARD RFI DETECTION

(75) Inventors: Steven M. Lang, Cary, NC (US); Mark C. Cassada, Hillsborough, NC (US); Christopher M. Olson, Chapel Hill, NC (US); Matthew K. Plonski, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 644 days.

(21) Appl. No.: 12/848,549

(22) Filed: Aug. 2, 2010

(65) Prior Publication Data

US 2012/0027055 A1 Feb. 2, 2012

(51) Int. Cl.
*H04B 7/185* (2006.01)

(52) U.S. Cl.
USPC ........................... 455/12.1; 455/427; 370/316

(58) Field of Classification Search
USPC .............. 455/12.1–13.4, 67.11, 67.13–67.16, 455/427–430; 370/316, 317
See application file for complete search history.

(56) References Cited

U.S. PATENT DOCUMENTS

| 6,105,060 | A | 8/2000 | Rothblatt |
| 6,233,433 | B1 * | 5/2001 | Norin .......................... 455/67.14 |
| 6,308,286 | B1 * | 10/2001 | Richmond et al. .............. 714/13 |
| 8,159,992 | B2 * | 4/2012 | Agarwal et al. ............... 370/316 |
| 2005/0059427 | A1 * | 3/2005 | Wallace ..................... 455/552.1 |

OTHER PUBLICATIONS

Saggese et al., "In-Orbit Testing of Digital Regenerative Satellite: The Italsat Planned Test Procedures", (1987), John Wiley & Sons, Ltd., (8 pages).

* cited by examiner

*Primary Examiner* — Raymond Dean
(74) *Attorney, Agent, or Firm* — Edell, Shapiro & Finnan, LLC

(57) ABSTRACT

In one embodiment there are provided systems and methods for detecting radio frequency interference (RFI) on a satellite that implements on-board processing. The system leverages an on-board programmable modem complex, and in some cases reprograms portions thereof, to function as an RF spectrum analyzer sensor element that captures and relays received RF information as meta-data to a ground-based system where that information can then be used, on the ground, to generate a spectral display of a received signal at the satellite.

16 Claims, 8 Drawing Sheets

SATELLITE ON-BOARD RFI DETECTION

TECHNICAL FIELD

The present disclosure relates to satellite communications, particularly satellite communications that employ satellites with advanced on-board processing capabilities.

BACKGROUND

An important task of a satellite operator is to ensure that the Radio Frequency (RF) signals transmitted by earth-bound satellite antennas do not interfere with each other as they are received at the satellite. Normally, resulting Radio Frequency Interference (RFI) at the satellite is easily detectable because, in a traditional "bent pipe" configuration, all transmissions to the satellite are shifted in frequency and, for all practical purposes, immediately transmitted back to the ground. The received RF emissions can then be analyzed using, e.g., a ground based spectrum analyzer and any interference can be uncovered.

With the advent of satellite architectures employing on-board processing, where the uplink transmissions are terminated at the satellite, uplink RFI cannot be seen on the ground. That is, in an on-board processing system, the uplink signal is demodulated on the satellite, and converted into digital data using a modem complex. The modem complex passes the data to a computer system or processor that operates on the data and then passes new downlink data back to the modem complex. The modem complex then synthesizes and modulates the downlink data for downlink transmission. Thus, the nature of any RFI present in a signal received at the satellite is lost by the time the modem complex has finished its receive processing. This makes detection of RFI nearly impossible and can result in undetected poor received signal quality at the satellite.

DESCRIPTION OF EXAMPLE EMBODIMENTS

Overview

Described herein are systems and methods for detecting RFI on a satellite that implements on-board processing. The system uses an on-board programmable modem complex, and in some cases reprograms portions thereof, to function as an RF spectrum analyzer sensor element that captures and relays received RF information as meta-data to a ground-based system where that information is then used to generate a spectral display.

Example Embodiments

Figure 1:
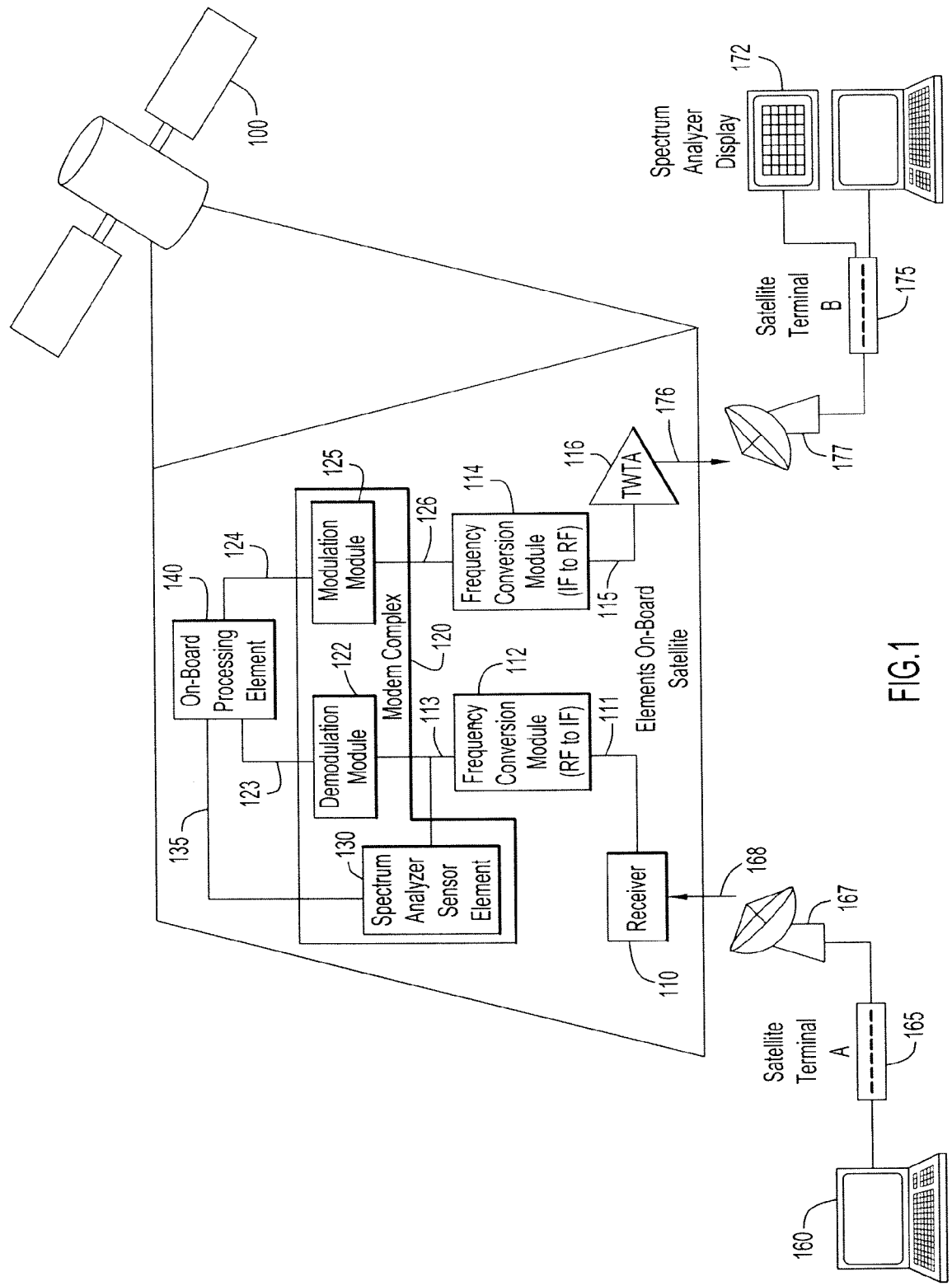
FIG. 1 shows components on-board a satellite that perform, at least partially, spectrum analysis of received signals.

FIG. 1 shows components on-board a satellite 100 that perform, at least partially, spectrum analysis of received signals. As shown, there is on-board satellite 100, a receiver 110 (e.g., a transponder) that receives uplink signals from, e.g., a satellite antenna 167 that is fed an uplink signal 168 from satellite terminal A 165. The original data, typically in digital form, may be supplied by a computer 160 that is itself connected to a network (not shown). The network may be of any type, including, e.g., an Ethernet network that handles packetized data.

Referring again to the elements on-board the satellite, the receiver 110 outputs a signal 111 that is passed to a frequency conversion module 112 that converts the signal 111, e.g., in the form of a radio frequency (RF), to an intermediate frequency (IF) that can be more easily processed by subsequent processing modules. More specifically, in the case of a satellite with on-board processing, a modem complex 120 is provided and receives the IF output 113 of the frequency conversion module 112. The IF output 113 is then demodulated by demodulation module 122 to provide original, e.g., packetized digital data 123 originally provided by computer 160 (or network connected thereto).

The packetized data 123 is then passed to at least one on-board processing element 140. On-board processing element 140 may be a routing complex that is configured to, among other things, route individual packets in a stream of packets to one or more other routers or other downstream network devices. An advantage of such space-based routing is that the need to "double hop" network traffic from the satellite to a ground gateway hub (for routing) and then back again to the satellite is eliminated. This, in turn, reduces latency by shortening the end-to-end path of a given communication channel. Furthermore, on-board demodulation of satellite signals separates the uplink and downlink to enable support of multiple selectable satellite antennas. Further still, Quality of Service can be applied to different streams of a demodulated signal such that, e.g., audio and video conferencing applications are provided higher bandwidth than, perhaps, a generic file download.

In any event, once packets are processed by on-board processing element 140, the output 124 thereof is passed back to the modem complex 120 in which a modulation module 125 modulates the packetized data to an IF. The thus-modulated data 126 is passed to frequency conversion module 114, which converts the IF modulated data 126 output from the modulation module 125 to an RF signal 115. RF signal 115 is then passed to a selected travelling wave tube amplifier (TWTA) 116 for transmission from the satellite via a downlink channel (transponder).

The downlink signal 176 from TWTA 116 is received by a satellite ground station antenna 177 and passed to satellite terminal B 175 for demodulation, etc. Resulting data may be passed to one of two locations: computer 170 (and associated network (not shown)) or spectrum analyzer display 172.

Spectrum analyzer display 172 operates in conjunction with spectrum analyzer sensor element 130 that is on-board the satellite 100. In order to troubleshoot RFI in a system employing on-board processing, spectrum analysis of the received signal 168 is implemented before the demodulation function. In this regard, spectrum analyzer sensor element 130 captures the IF signal 113 from the frequency conversion module 112 before that signal is processed by demodulation module 122. The resulting frequency analysis data 135 is passed to on-board processing element 140 for, e.g., packetization, and then sent, similarly to other packetized data, to modulation module 125, frequency conversion module 114 and TWTA 116 for downlink to satellite terminal B 175. The frequency analysis data can then be passed to spectrum analyzer display 172 for viewing by a user.

Figure 2:
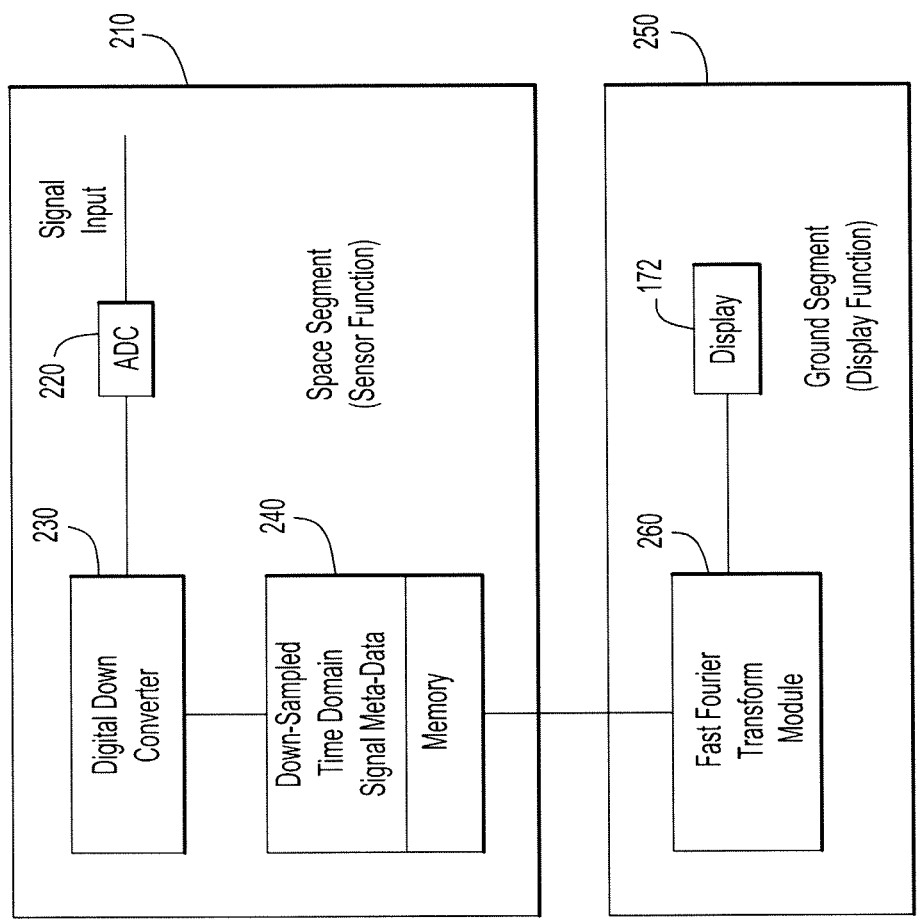
FIG. 2 shows space and ground segments for performing spectrum analysis on a received signal at a satellite.

FIG. 2 shows space segment 210 and ground segment 250 for performing spectrum analysis on the received signal 168. Analog-to-digital conversion (ADC) module 220 receives analog IF signal 113 and converts it to digital "chunks" that are sent for processing by the demodulation module 122 and, in this case, also are sent to digital down converter (DDC) 230 within spectrum analyzer sensor element 130. The output of DDC 230 is down-sampled time domain signal meta-data (also referred to as "metadata"), which can be stored in, or passed through, a buffer or memory 240. This meta-data comprises actual sampled data along with context information such as time that together enable a display to graphically present a radio spectrum. The down-sampled time domain signal meta-data is then passed to on-board processing element 140 as shown in FIG. 1, so as to be processed for downlink to the satellite terminal B 175.

FIG. 2 also depicts a ground segment 250 that receives the meta-data, and that performs a fast Fourier transform on that data as indicated by module 260. The results are then passed to display module 172 that is configured to present a graphical frequency spectrum based on that data.

Figure 3:
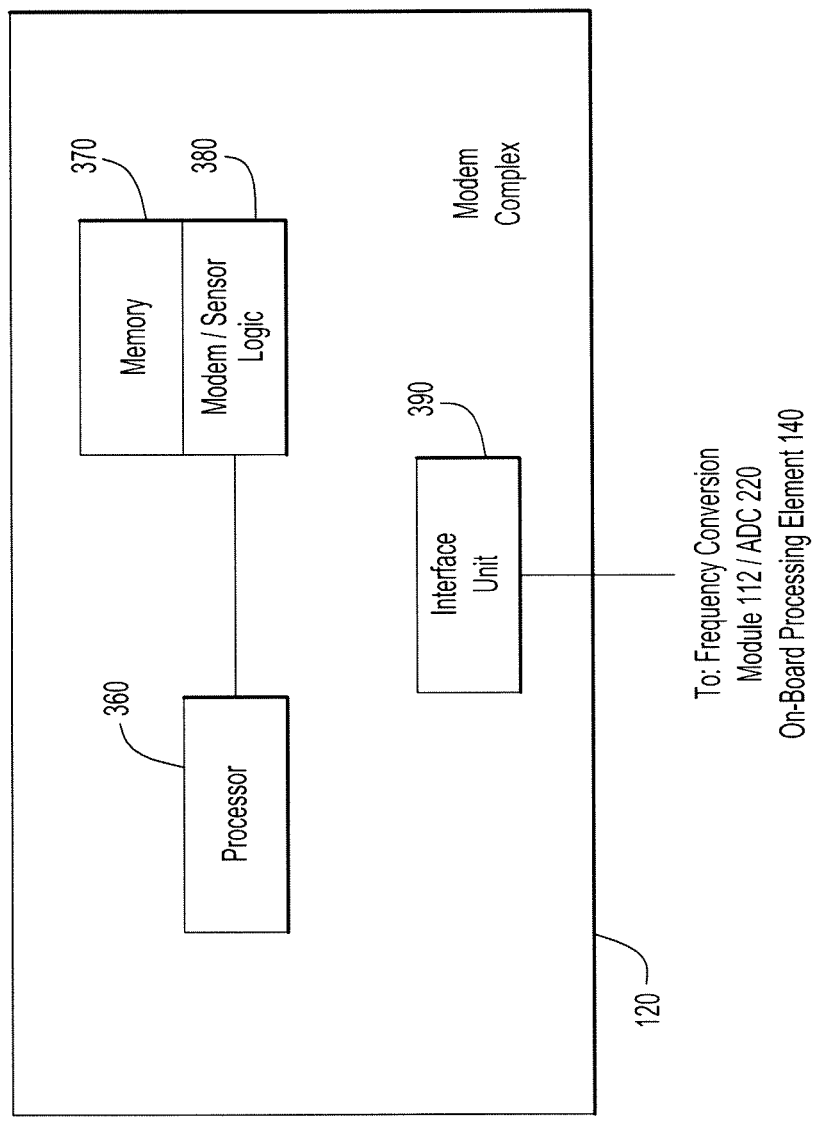
FIG. 3 shows an example implementation of a re-programmable modem complex for performing spectrum analysis of a received signal at the satellite.

FIG. 3 shows an example implementation of the modem complex 120 that can be configured to perform partial spectrum analysis of a received signal at the satellite 100. The modem complex 120 (and spectrum analysis sensor element) may be implemented as one or more hardware components, one or more software components, or combinations thereof. More specifically, the modem complex 120/sensor element 130 may be implemented as a programmable processor (microprocessor or microcontroller) or a fixed-logic processor 360. In the case of a programmable processor, any associated memory 370 may be of any type of tangible processor readable memory (e.g., random access, read-only, etc.) that is encoded with or stores instructions, such as sensor/modem logic 380 that may employed to effect the modem complex 120/sensor element 130 of the space segment 210. Alternatively, the modem complex 120 of the space segment 210 may be comprised of a fixed-logic processing device, such as an application specific integrated circuit (ASIC) or digital signal processor that is configured with firmware comprised of instructions or logic (e.g., modem/sensor logic 380) that cause the processor 360 to perform the functions described herein. Thus, the modem complex 120 of the space segment 210 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor (or computer) readable medium that is encoded with instructions for execution by a processor that, when executed by the processor, are operable to cause the processor to perform the functions described herein. To enable connectivity with, e.g., frequency converter module 112 and on-board processor element 140, an interface unit 390 may also be provided to effect connectivity with an on-board bus and/or other connection approaches.

Thus, as explained, a digital spectrum analyzer is implemented between a receive transponder (e.g., receiver 110) and a programmable satellite modem (e.g., modem complex 120) on-board the satellite 100. The up-link signal of interest (e.g., signal 168 along with any interfering signal) is converted to the frequency domain via the digital down converter 230 and the generated digital spectrum is relayed either in-band (via the same transponder or a different one) or out-of-band to an earth station (e.g., satellite terminal B 175) for analysis.

In one implementation, the space segment sensor function 210 is configured to be controlled via out-of-band communication. This provides the ability to investigate the frequency spectrum for RFI without having to disrupt service, as any disruption is often fatal to the system being observed, or before service is established.

In an embodiment, the modem complex 120 comprises several re-programmable elements and, in one configuration, one modem in the array supports each transponder on the satellite 100 to which the system connects. In one actual implementation, the modem complex 120 employs three active modems (with one held in an inactive state as a redundant spare) that connect with three transponders. FIGS. 4-7 depict several modem card embodiments 400, 500, 600, 700a, 700b that support the spectrum analyzer functionality. These re-programmable modems cards allow for a single waveform algorithm to evolve using updated code loads. In addition, they allow new waveforms to be added to the system. While in some systems, the entire modem array operates using the same waveform algorithm software, in the embodiments described herein one modem may be programmed differently from the others, namely to function as a spectrum analysis sensor.

Under normal operating conditions, the re-programmable signal processors (e.g., processor 360) in the modem array process the incoming and outgoing streams using the waveform code corresponding to the ground terminals sending and receiving the RF emissions. If RF interference were suspected on one of the transponders, the corresponding modem can be reloaded (e.g., re-programmed) with code to perform the digital down converting. Whereas a standard spectrum analyzer would take the output samples from the DDC, convert the samples to the frequency domain and plot the resulting data on a display screen, the down-converted data samples on the satellite generated by such a re-programmed modem are transported down to earth via modem complex 120 where they form the input to a remote spectrum analyzer (e.g., ground segment 250).

For satellite modem complexes with multiple modems, the meta-data output from the modem running the spectrum analyzer code is itself packetized and sent out via one of the other modems to ground systems using, e.g., TCP/IP or whatever networking protocol supported by the system. Alternately, if the system only possessed one transponder/modem combination, the meta-data from the spectrum analyzer code could be stored on the system (e.g., in memory 370) and transported to the ground once the waveform code (modem code) was once again loaded into the re-programmable processor 360.

During satellite troubleshooting it is possible to be in a situation where in-band communication is not available through the transponder under investigation. For this reason, satellite command and control operations may be performed through a very robust transponder channel. This channel enables very basic out-of-band management to be performed on the components of the satellite without regard to the status of the other transponders. In one embodiment, this robust transponder channel/out-of-band interface is used to control the spectrum analyzer settings and to download the spectrum analysis data samples.

It is possible that when a given modem is re-programmed with spectrum analyzer code, waveform processing for all terminals under the effected modem/transponder combination may be disrupted. Assuming there were sufficient resources within the re-programmable processor 360, it is possible to insert the spectrum analyzer/digital down converter code as a shim layer. The shim layer receives the raw input (already analog-to-digitally converted) and passes that to the spectrum analyzer code. It would also duplicate the received digital raw input and pass it to the waveform code. Still another possibility exists for systems that employ redundant modem cards. Assuming the bus structure and power budgets allow, a redundant modem card could be pressed into service as the spectrum analyzer. The redundant modem card could perform analysis operations on the received stream, but also duplicate the stream to the modem that normally processes the waveform in an attempt to reduce the impact to users on the analyzed transponder.

Thus, there are a number of possible configurations for the modem complex 120 to support the space segment sensor function 210. Several of these configurations are explained next with reference to FIGS. 4-7.

Figure 4:
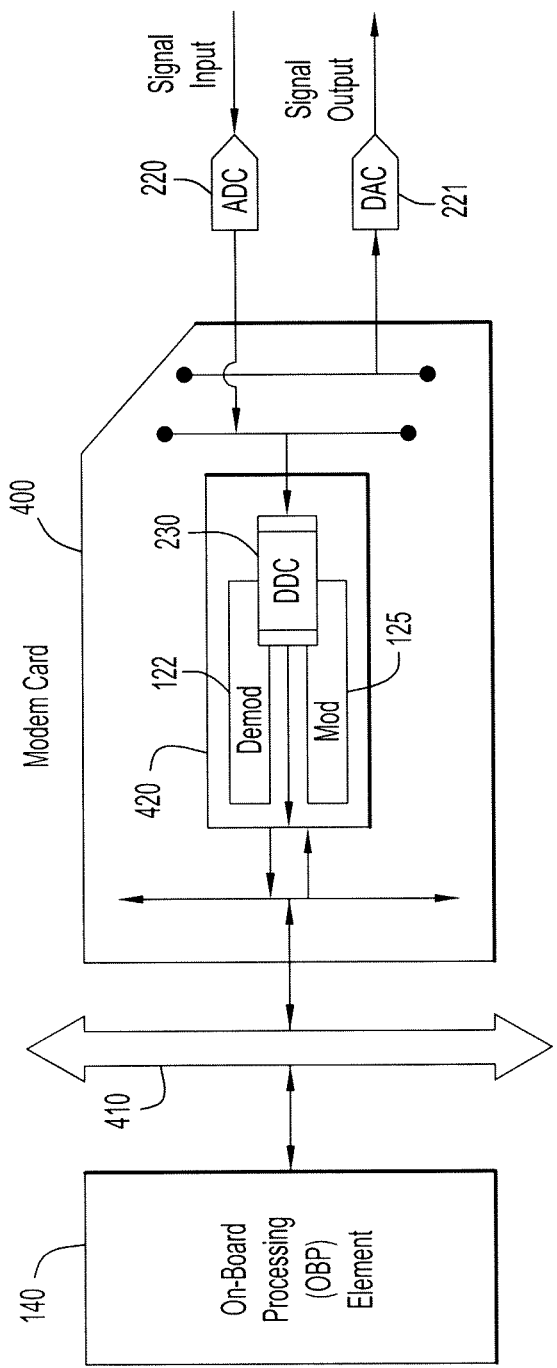
FIG. 4 shows an embodiment in which the modulator/demodulator function of a modem complex is reprogrammed to perform spectrum analysis.

In a first configuration depicted by FIG. 4, there is a limited capacity modem processing element 420 on modem card 400. That is, the modem card 400 can either handle waveform processing or DDC processing, but not both. In this configuration out-of-band (OOB) configuration commands may be used to re-program the modem card 400 with the DDC function code 230. The duration of the DDC processing and other tunable parameters may also be supplied via OOB commands. The resulting DDC meta-data 135 is passed to the on-board processing element 140 and stored for later retrieval (storage could also occur within the modem complex 120). At the end of the sampling duration, the waveform modem code is re-programmed back into the modem card 400. Finally, the stored meta-data is retrieved by the ground segment for display. FIG. 4 also shows how the modem card can communicate via a bus 410, and that a digital to analog converter 221 is used to generate an analog signal for downlink transmission.

Figure 5:
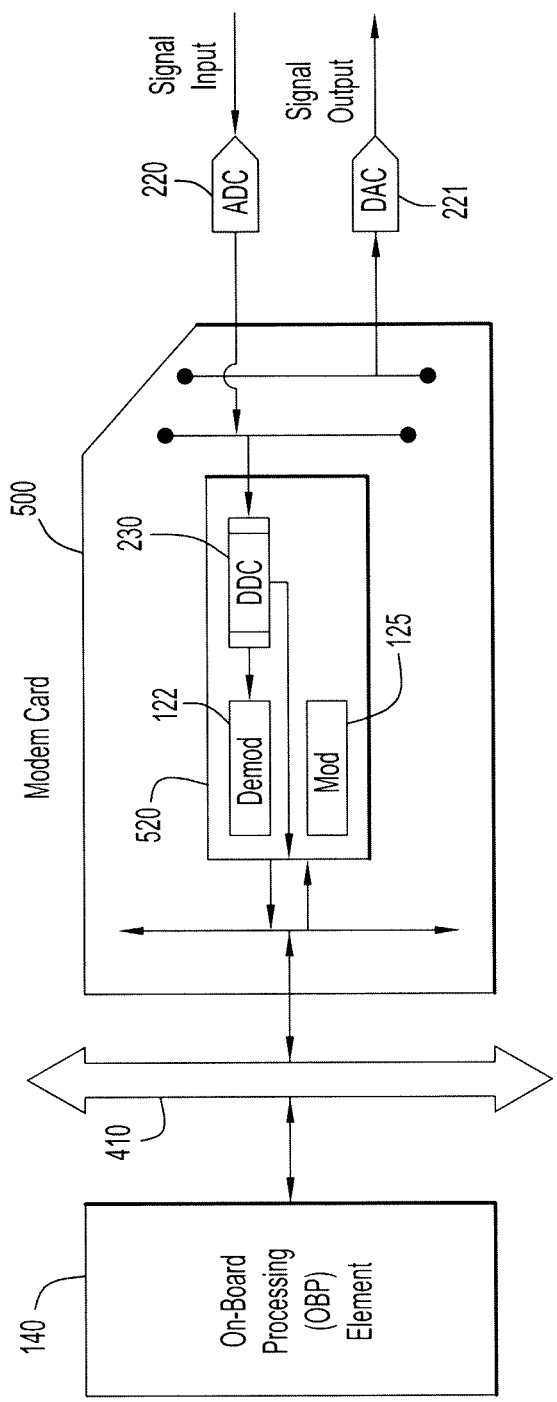
FIG. 5 shows another embodiment in which the modulator/demodulator function of a modem complex is reprogrammed to perform spectrum analysis.

In a second configuration depicted by FIG. 5, a larger capacity modem card 500 is provided that can handle both waveform processing and DDC processing, simultaneously. That is, the re-programmable processing element 520 handling the modem functions for the waveform has sufficient capacity to perform both waveform processing and DDC processing. Thus, in this embodiment, an in-band configuration command may be used to enable the DDC function code 230 within the modem card 500. Likewise, duration and other tunable parameters may also be supplied in-band. In one implementation, original digital chunks from the ADC 220 are duplicated by the DDC module 230 with one chunk passed untouched to the demodulation module 122 and one chunk processed by the DDC module 230. DDC meta-data is passed to the on-board processing element 140 and then, e.g., in-band to the ground segment. Normal network communication processing proceeds under this configuration.

Figure 6:
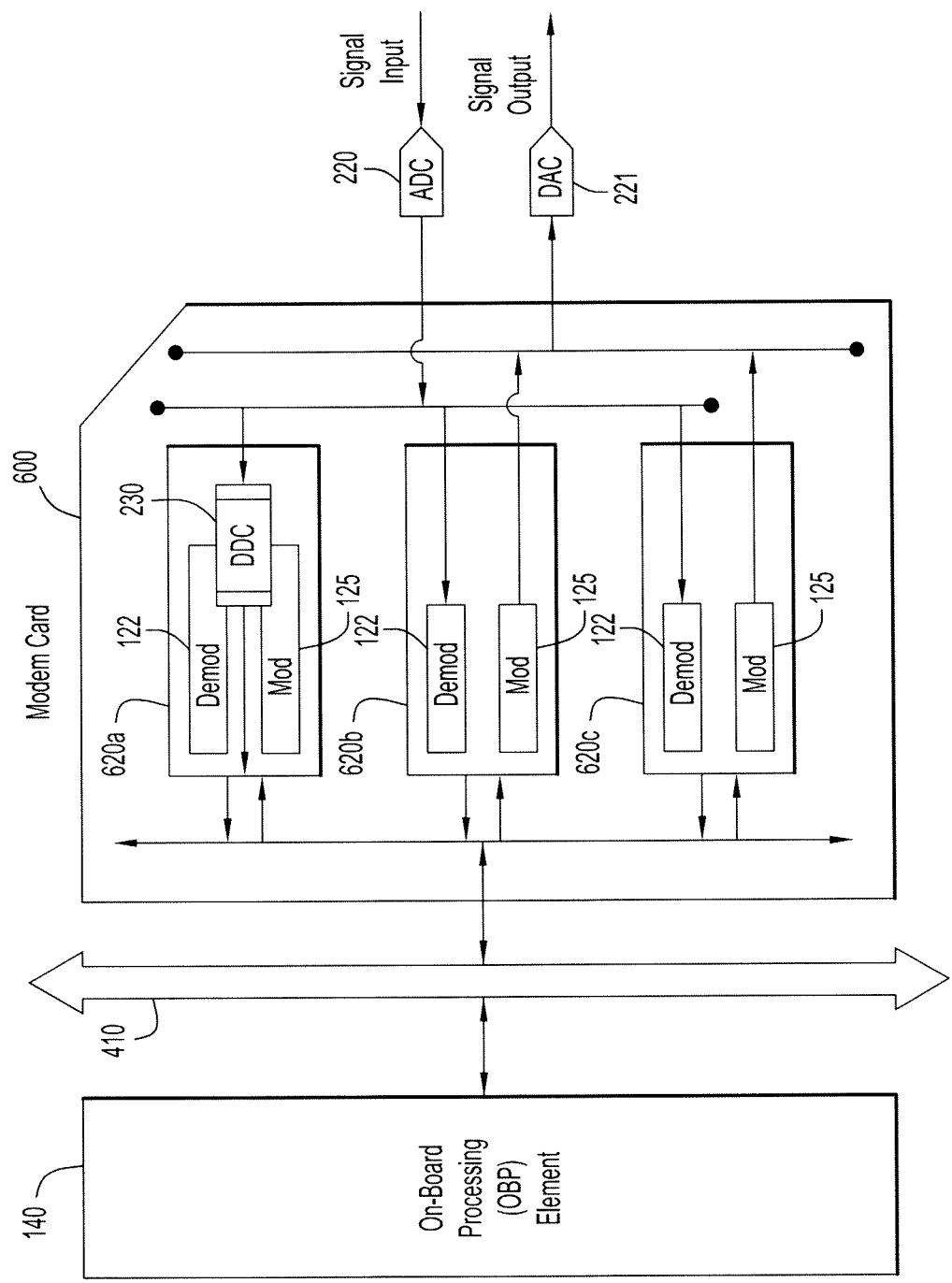
FIG. 6 shows still another embodiment in which the modulator/demodulator function of a modem complex is reprogrammed to perform spectrum analysis.

In a third configuration depicted by FIG. 6, multiple limited capacity modem processing elements on a single modem card 600 are implemented for, e.g., radiation robustness. One of the processing elements 620a can be employed for DDC processing allowing the others 620b, 620c to perform waveform processing in a reduced robustness capacity. Thus, in this configuration, the modem card 600 has multiple re-programmable modem processing elements 620a-c to aid in radiation robustness, each of which has insufficient capacity to handle both waveform processing and DDC processing. In-band configuration commands may be used to re-program one of the modem processing elements (620a) with the DDC function code. The duration and other tunable parameters may also be supplied in-band. The other processing elements 620b, 620c continue to perform their modem functions but in a degraded state. The DDC meta-data 135 is passed to the on-board processing element and then, e.g., in-band to the ground segment. As with the second configuration, normal network communication processing proceeds. At the end of the sampling duration, the DDC element 230 is re-programmed with the waveform modem function.

Figure 7:
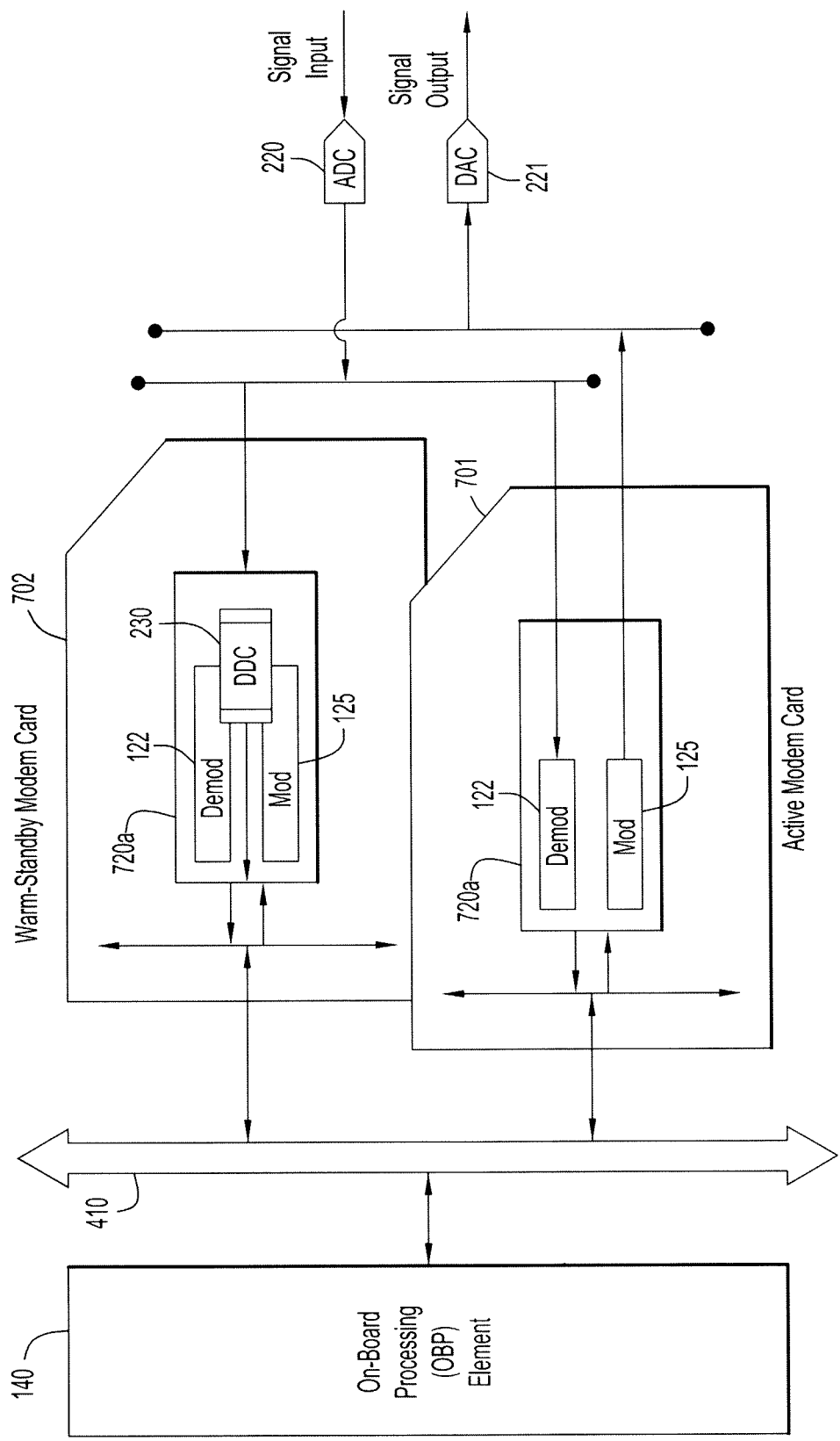
FIG. 7 shows yet another embodiment in which the modulator/demodulator function of a modem complex is reprogrammed to perform spectrum analysis.

Finally, in a fourth possible configuration, depicted by FIG. 7, an active 701 and warm-standby 702 modem card employing limited capacity modem processing elements 720a, 720b where the warm-standby modem card 402 can be selected for service for DDC processing while the active modem card continues waveform processing. In-band configuration commands may be used to re-program the modem processing element 720a on the warm-standby modem card 702 with the DDC function code 230. The duration and other tunable parameters may also be supplied in-band. The active modem card 701 continues communication processing, while DDC meta-data 135 is passed to the on-board processing element 140 and then, e.g., in-band to the ground. At the end of the sampling duration, the warm-standby modem card 702 is re-programmed with waveform code and returned to a warm-standby state.

It is noted that in the embodiments of FIGS. 5-7 user traffic can continue to flow through the satellite while troubleshooting the communications link.

Figure 8:
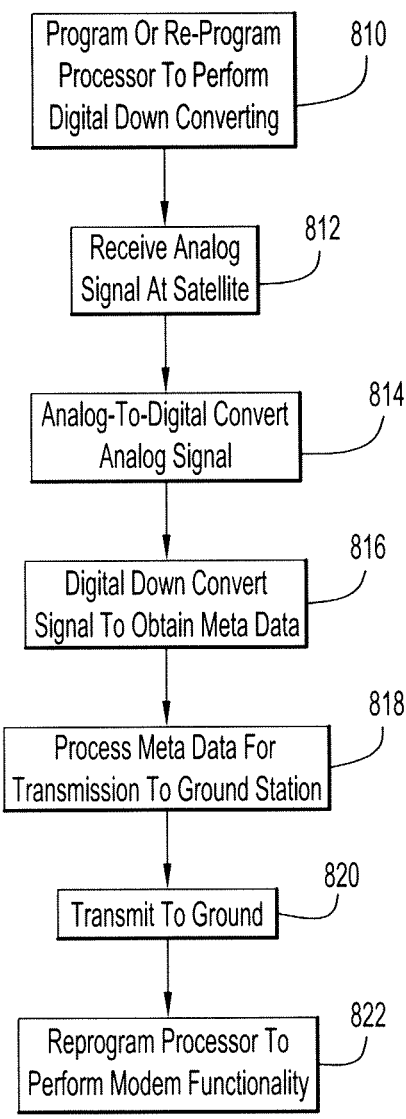
FIG. 8 depicts an example series of steps that may be performed to obtain spectral analysis in connection with a satellite that conducts on-board processing of received signals.

FIG. 8 depicts an example series of steps that may be performed to obtain spectral analysis in connection with a satellite that conducts on-board processing of received uplink signals.

Beginning at step 810, a processor (within, e.g., modem complex 120) is re-programmed to perform digital down converting of a received digital signal. At step 812, a satellite receives an analog signal. That signal will likely include a desired uplink signal, but may also include one or more interfering signals that might increase the noise associated with the desired uplink signal. At step 814, the received analog signal is analog-to-digitally converted on-board the satellite. At this point, the resulting digital signal is provided to, e.g., digital down converter module 230 (e.g., the re-programmed processor) so that at step 816 the resulting digital signal is digitally down converted. The result of this conversion is down-sampled time-domain signal meta-data. This meta-data, at step 818, is processed for transmission to a ground station. Processing may include packetization of the meta-data, as well as digital-to-analog conversion. At step 820, the processed meta-data is transmitted to ground. The processed meta data can be transmitted in real time, namely substantially at the same time as it is generated, or it may instead stored in memory for subsequent transmission, after, e.g., step 822 wherein the processor is re-programmed back to an original functionality, such modem functionality.

Although not shown in FIG. 8, the meta-data transmitted, or downlinked, to ground is then retrieved and processed for presentation as a spectrum analysis graphical display. The spectrum analysis can be compared to a spectrum analysis of an uplink analog signal to detect the presence of radio frequency interference (RFI) at a receive antenna of the satellite.

As part of the downlink transmission and as a result of on-board processing capabilities, it is possible in accordance with one possible implementation to select a downlink channel (or transponder) from among a plurality of downlink channels (or transponders) via which to send the down-sampled time-domain signal meta-data. This provides flexibility to satellite operators to select an appropriate downlink channel to, e.g., least impact satellite operations, or to ensure robustness of the downlink by using, e.g., an out of band control channel.

In an embodiment, re-programming of a processor to perform the digital down converting function lasts only for a predetermined amount of time. That amount of time is selectable by the satellite operator, but should be sufficient to capture and analyze enough received data to provide useful spectrum analysis to a ground based user.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
   receiving an analog signal at a satellite;
   analog-to-digital converting the analog signal on-board the satellite to obtain a digital form of the analog signal;
   digital down converting the digital form of the analog signal to obtain down-sampled time-domain signal meta-data of the digital form of the analog signal;
   processing the down-sampled time-domain signal meta-data via a programmable modem for transmission to a ground station;
   reprogramming the programmable modem, for a predetermined amount of time, to perform the digital down converting; performing spectrum analysis of the down-sampled time-domain signal meta-data; and comparing a spectrum analysis of an uplink analog signal to results of the spectrum analysis of the down-sampled time-domain signal meta-data to detect the presence of radio frequency interference(RFI) at a receive antenna of the satellite.

2. The method of claim 1, further comprising selecting a downlink channel from among a plurality of downlink channels via which to send the down-sampled time-domain signal meta-data.

3. The method of claim 2, further comprising sending the down-sampled time-domain signal meta-data to a ground station via an in-band channel.

4. The method of claim 2, further comprising sending the down-sampled time-domain signal meta-data to a ground station via an out of band command and control channel.

5. The method of claim 1, further comprising performing spectrum analysis of the down-sampled time-domain signal meta-data.

6. A processor readable medium encoded with instructions that, when executed by a processor, cause the processor to:
   receive an analog signal at a satellite;
   analog-to-digital convert the analog signal on-board the satellite to obtain a digital form of the analog signal;
   duplicate the digital form of the analog signal into first digital data and second digital data;
   digitally down convert the first digital data to obtain down-sampled time-domain signal meta-data of the digital form of the analog signal;
   demodulate the second digital data to perform waveform processing simultaneously with digital down converting the first digital data; and
   process the down-sampled time-domain signal meta-data via a programmable modem for transmission to a ground station.

7. The processor readable medium of claim 6, further comprising instructions that, when executed by the processor, cause the processor to:
   employ the programmable modem on-board the satellite to perform the digital down converting.

8. The processor readable medium of claim 7, further comprising instructions that, when executed by the processor, cause the processor to:
   reprogram the programmable modem, for a predetermined amount of time, to digitally down convert the digital form of the analog signal.

9. The processor readable medium of claim 6, further comprising instructions that, when executed by the processor, cause the processor to:
   select a downlink channel from among a plurality of downlink channels via which to send the down-sampled time-domain signal meta-data.

10. The processor readable medium of claim 9, further comprising instructions that, when executed by the processor, cause the processor to:
    send the down-sampled time-domain signal meta-data to a ground station via an in-band channel.

11. The processor readable medium of claim 9, further comprising instructions that, when executed by the processor, cause the processor to:
    send the down-sampled time-domain signal meta-data to a ground station via an out of band command and control channel.

12. The processor readable medium of claim 6, further comprising instructions that, when executed by the processor, cause the processor to:
    re-program the programmable modem to operate as a modem and not as a digital down converter.

13. An apparatus, comprising:
    a receiver;
    a reprogrammable modem configured to receive a digital signal from the receiver; and
    a spectrum analyzer sensor element configured to receive a duplicate copy of the digital signal from the receiver prior to the digital signal being processed by a demodulation module of the reprogrammable modem, the spectrum analyzer sensor element configured to digitally down convert the duplicate copy of the digital signal to obtain down-sampled time-domain signal meta-data of the digital signal simultaneously with the demodulation module processing the digital signal.

14. The apparatus of claim 13, further comprising an on-board router configured to receive the down-sampled time-domain signal meta-data and forward the same or a processed version of the same to a modulation module.

15. The apparatus of claim 13, wherein the reprogrammable modem comprises a plurality of modem cards, at least one of which is configured to be reprogrammed to perform digital down converting.

16. The apparatus of claim 15, further comprising a memory configured to store the meta data until such time as the at least one reprogrammable modem is programmed back to an original state prior to being re-programmed to perform digital down converting.

* * * * *